United States Patent [19]
King

[11] Patent Number: 5,829,873
[45] Date of Patent: Nov. 3, 1998

[54] APPARATUS FOR MIXING GRANULAR FERTILIZER AND/OR LAWN TREATMENT LIQUID IN WATER

[76] Inventor: Woodrow King, 2026 NW. 51st St., Miami, Fla. 33142

[21] Appl. No.: 572,857

[22] Filed: Dec. 14, 1995

[51] Int. Cl.⁶ .................. B01F 5/04; B01F 15/02
[52] U.S. Cl. .................. 366/171.1; 366/172.1; 366/181.3; 366/181.4
[58] Field of Search .............. 366/168.1, 171.1, 366/172.1, 172.2, 174.1, 181.1, 181.2, 181.3, 181.4, 182.3, 183.2, 262–265, 270, 302, 306, 307

[56] References Cited

U.S. PATENT DOCUMENTS

| | | | |
|---|---|---|---|
| 566,143 | 8/1896 | Cormwell et al. | 366/168.1 X |
| 661,207 | 11/1900 | Carter . | |
| 2,387,488 | 10/1945 | Acken et al. | 366/172.1 X |
| 2,405,091 | 7/1946 | Culbreth . | |
| 2,451,462 | 10/1948 | Yglesias-Paz . | |
| 2,520,957 | 9/1950 | Peterson | 366/172.1 X |
| 2,833,630 | 5/1958 | Loevenstein | 366/168.1 X |
| 3,995,839 | 12/1976 | Zingg | 366/168.1 X |
| 4,021,021 | 5/1977 | Hall et al. . | |
| 4,099,267 | 7/1978 | King | 366/172.1 X |
| 4,364,275 | 12/1982 | LaMar . | |
| 4,419,980 | 12/1983 | Leary et al. . | |
| 4,798,131 | 1/1989 | Ohta et al. . | |
| 4,955,723 | 9/1990 | Schneider | 366/168.1 X |
| 5,314,076 | 5/1994 | LaPlace et al. . | |

FOREIGN PATENT DOCUMENTS

| | | | |
|---|---|---|---|
| 201583 | 3/1956 | Australia | 366/168.1 |
| 582652 | 9/1958 | Italy | 366/168.1 |

*Primary Examiner*—Charles E. Cooley
*Attorney, Agent, or Firm*—Oltman, Flynn & Kubler

[57] ABSTRACT

An apparatus is provided for mixing granular fertilizer and/or a liquid insecticide or other treatment liquid in water in an upstanding tank having an opening for its water supply which is piped to the tank above a porous strainer to an area in the upstanding tank below the porous strainer and to a pipe whose function is to provide a pressurized flow of water to the tank for cleaning purposes. The bottom of the tank has an outlet for dispensing the mixture into an irrigation piping system or a sprayer attachment. The apparatus has a motor-driven vertical shaft with upper and lower blades inside the tank. A screen with a funnel-shaped wide upper end and a smaller cylindrical lower end extends around the shaft from a location near the upper end of the tank down to a point perpendicular to the horizontal plane of the bottom of the inner tank. A porous strainer extends across the top of the tank above the wide funnel mouth of the screen. A hopper at the top of the tank passes granular fertilizer down onto this strainer and all except oversized particles pass down through this strainer into the tank at the constriction of the screens. A reservoir for the insecticide or other lawn treatment liquids extends from the top of the tank down to a manual valve which extends down through the strainer for passing the liquid down into the tank at the inside of the screen. A spray pipe extends around and through the funnel-shaped end of the screen for spray-cleaning the screen, when needed.

11 Claims, 7 Drawing Sheets

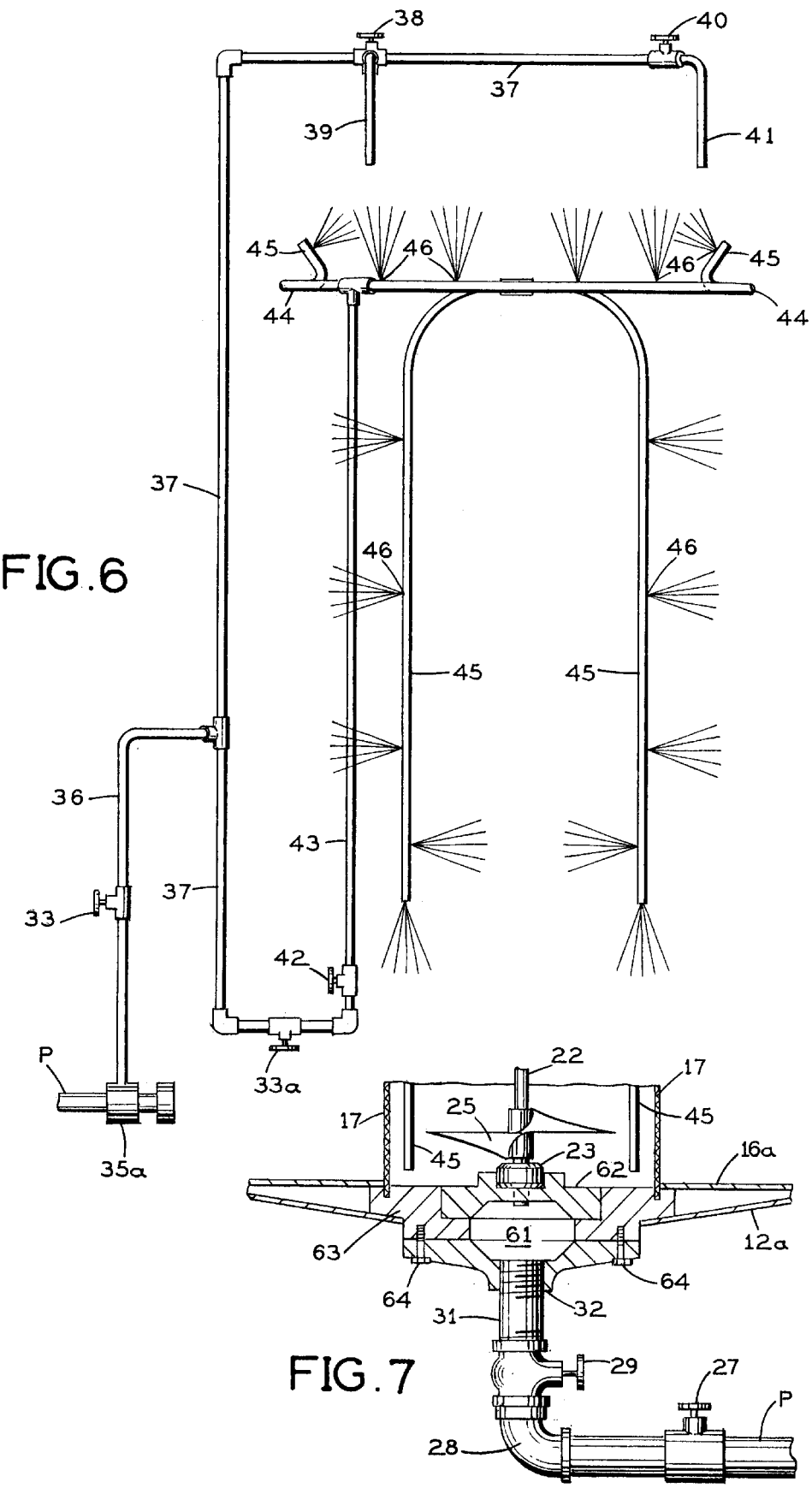

BACKFLOW PREVENTER WITH PIPING LAYOUT

APPARATUS FOR MIXING GRANULAR FERTILIZER AND/OR LAWN TREATMENT LIQUID IN WATER

This invention relates to lawn care, and in particular to an inexpensive, practical, easily maintained mixing apparatus for use by professional lawn service organizations or farmers for mixing granular fertilizer before spraying it onto the ground. This invention is related to U.S. Pat. No. 4,009,267 by the subject inventor thereof, which is incorporated by reference.

BACKGROUND OF THE INVENTION

Gardeners, professional lawn services and farmers have had a need for mixing granular and/or liquid fertilizer before spraying -the mixture onto the ground. However, the materials used in these mixtures has proved harmful to those persons handling and controlling the dispensing of those materials. Furthermore, traditional sprayers and containers used for handling those materials must be continuously cleaned and maintained. Thus, performing the necessary cleaning operations to maintain the safe operation of those sprayers and storage containers puts the user at risk from those chemicals. Still furthermore, the surrounding water supplies have also been harmed by being contaminated from chemical spillage.

SUMMARY OF THE INVENTION

A primary object of this invention is to provide a novel and improved apparatus for mixing granular fertilizer and/or a treatment liquid, such as an insecticide, in water before spraying the mixture onto the ground.

A secondary object of this invention is to provide a separate water supply independent from the dispensing area in the tank so a greater degree of control can be provided for safety: 1) in handling and controlling insecticides; 2) controlling risk of contamination of water supply; 3) in performing the cleaning operations necessary to maintain the safe operation of the apparatus.

A third object of this invention is to provide such an apparatus which is particularly intended for use by commercial lawn service organizations and farmers.

In a preferred embodiment of this invention, a novel apparatus and design is provided for mixing granular fertilizer and/or a liquid insecticide or other treatment liquid in water in an upstanding tank having an opening for its water supply which is piped to the tank above a porous strainer to an area in the upstanding tank below the porous strainer and to a pipe whose function is to provide a pressurized flow of water to the tank for cleaning purposes. The bottom of the tank has an outlet for dispensing the mixture into an irrigation piping system or a sprayer attachment. The apparatus has a motor-driven vertical shaft with upper and lower blades inside the tank. A screen with a funnel shaped wide upper end and a small cylindrical lower end extends around the shaft from a location near the upper end of the tank down to a point perpendicular to the horizontal plane of the bottom of the inner tank. A porous strainer extends across the top of the tank above the wide funnel mouth of the screen. A hopper at the top of the tank passes granular fertilizer down onto this strainer and all except oversized particles pass down through this strainer into the tank at the constriction of the screens, A reservoir for the insecticide or other lawn treatment liquids extends from the top of the tank down to a manual valve which extends down through the strainer for passing the liquid down into the tank at the inside of the screen. A spray pipe extends around and through the funnel-shaped end of the screen for spray-cleaning the screen, when needed. The water supply pipes above the porous strainer have sufficient pressure to introduce water into the tank at the inside of the screen area. The tank preferably includes an outer tank and a slightly smaller, concentric inner tank with a bottom opening designed with a drain basin which screws out to remove large clogs developed from tank residue. An adaptable clean-out plug suitable for the receiving pipe is fitted to this bottom opening in the outer tank.

In the preferred embodiment, the motor for the mixer shaft is preferably mounted beneath the top of the tank. The motor shaft extends through a sealed upper bearing mounted in the porous strainer, and the upper mixing blade is housed just below this strainer. The lower bearing is supported in the bearing housing in the drain basin. The lower mixing blades are located a short distance above the lower bearing.

Further objects and advantages of this invention will be apparent from the following detailed description of a presently preferred embodiment which is illustrated schematically in the accompanying drawings.

BRIEF DESCRIPTION OF THE FIGURES

FIG. 6 is a partial blown up section of piping shown in FIG. 2.

FIG. 7 is a partial blown up section of the drain basin and clean out plug located at the bottom of the tank shown in FIG. 2.

FIG. 7b is a cross-sectional side view of the drain basin plate of FIG. 7a.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
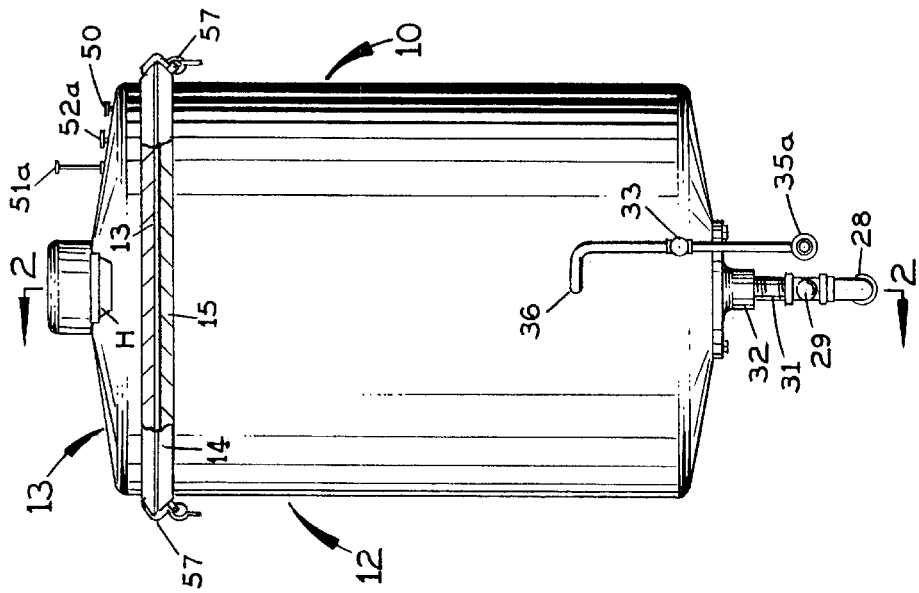
FIG. 1 is a perspective view of the subject invention.
Figure 2:
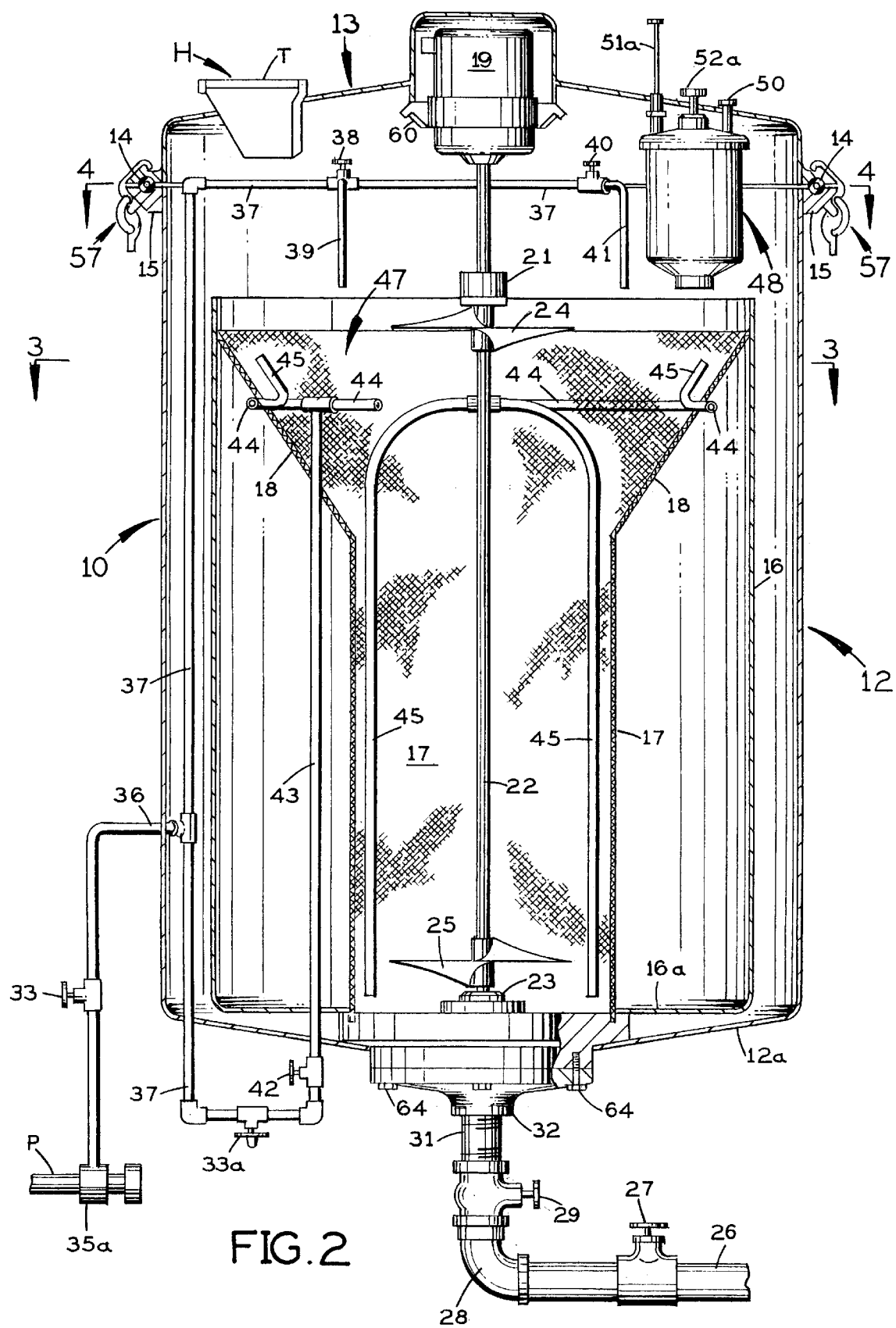
FIG. 2 is a vertical section taken along arrow 2—2 of the subject invention of FIG. 1.

In reference to FIGS. 1 and 2, a unitary tank assembly 10 includes an upstanding cylindrical outer tank 12 and an upstanding inner tank 16 spaced inside the outer tank and concentric with the latter. The inner tank 16 is open at the top and has an annular, flat, horizontal bottom wall 16a extending inward from the lower end of its cylindrical side wall and defining a central opening 16b. The outer tank 12 has a flat, substantially horizontal bottom wall 12a extending inward from the lower end of its cylindrical side wall a short distance below the bottom wall 16a of the inner tank and across the central opening 16b in the latter.

A top cover 13 is releasably attached to the upper end of the outer tank 12. The outer tank has an annular rim 15 at its upper end which presents an upwardly-facing groove of semi-circular cross-section for receiving an O-ring 14 comprised of material such as but not limited to rubber, rubber-like material and the like. The top cover 13 has a similar annular rim 13a with a downwardly facing groove of semi-circular cross-section for engagement of the O-ring 14. A plurality of clamps 57 (seen more clearly in FIG. 5) holds the top cover 13 down on the outer tank 12, with the O-ring 14 providing a fluid-tight seal between them.

Inside the inner tank 16 shown in FIG. 2 is located a generally funnel-shaped copper screen having a cylindrical lower end 17 and upwardly and outwardly flared upper end 18. The lower end 17 of the screen is spaced a substantial distance radially inward from the side wall of the inner tank 16 and extends down snugly through the central opening 16b in the bottom wall 16a of the inner tank 16 into engagement with the bottom wall 12a of the outer tank 12. The flared upper end 18 of the screen is suitably attached at the top to the inside of the cylindrical side wall of the inner tank 16 around the latter's entire extent a short distance below its open upper end.

Figure 7A:
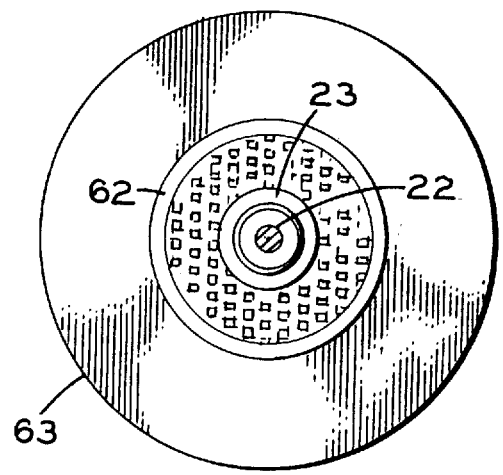
FIG. 7a is a top view of the drain basin plate.
Figure 7B:
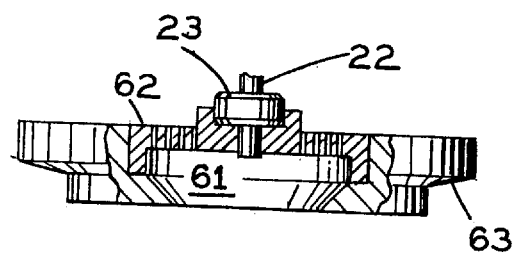

Referring to FIGS. 2 and 7, an electric motor 19 is centrally mounted inside the top cover 13. Motor 19 drives a vertical shaft 22, which extends down through the center of the funnel-shaped screen 17 and 18. A support bracket 60 for the motor 19 is attached to the underside of the top cover 13. At the bottom wall 16a of the inner tank 16, a lower sealed bearing 23 rotatably receives the lower end of the motor-driven shaft 22. This bearing is in the center of the drain basin 61 which is supported by a recessed metal plate 62 which is secured by bolts 64 to the screw threaded coupling 63. A lower set of mixing blades 25 is affixed to the shaft 22 a short distance above the lower bearing 23. Referring to FIG. 2, the motor-driven shaft 22 is engaged by an upper sealed bearing 21, which is mounted in the center of a strainer 47 extending horizontally across the inside of the inner tank 16 immediately above the wide-mouthed upper end 18 of the screen. Upper set of mixing blades 24 is affixed to the shaft 22 immediately below upper bearing 21.

Referring to FIG. 2, a hopper, H, having a hinged top, T, is mounted on the top cover 13 for the tank 12. Hopper, H, has an open lower end, O, which is spaced above the strainer 47 for discharging granular fertilizer onto the strainer when the top, T, of the hopper is opened and the fertilizer is poured down through it. Fertilizer particles pass down through the strainer 47 into the space bounded by the flared upper end 18 of the screen.

Figure 8A:
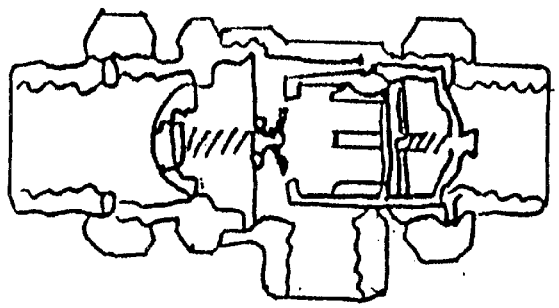
FIG. 8a is a cross-sectional side view of a preferred back-flow prevention device, which is a redundant feature where the supply line entry point is well above the bottom of the inner tank.
Figure 8:
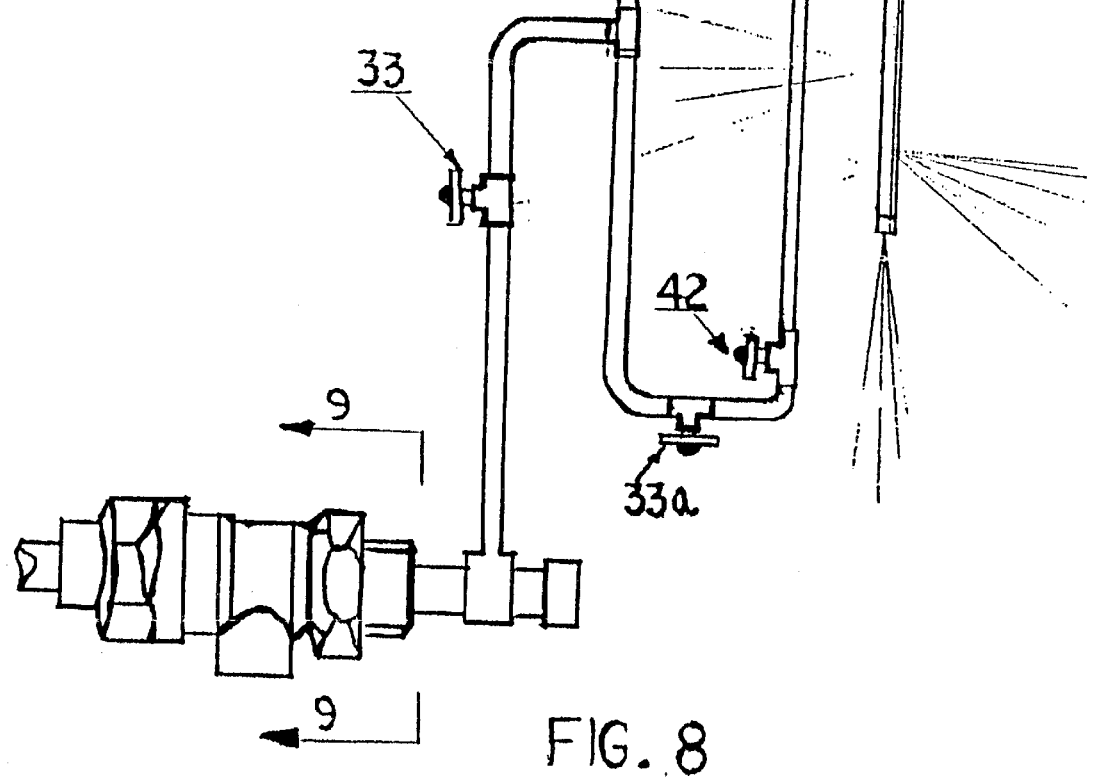
FIG. 8 is a layout of the water supply piping for the apparatus showing required backflow preventer connections necessary for pollution control used in FIG. 2.

Referring to FIGS. 2, 6 and 8, water supply pipes are connected through respective manual shutoff valves 38 and 40 to a pipe 37 extending horizontally across the top of the inner tank 16 and down between the side walls of the inner and outer tank 16 and 12 and out through the bottom wall 12a of the outer tank. Pipe 37 receives water from a supply conduit, P, via a branch pipe 35a and manual shut-off valve 33.

Referring to FIGS. 2 and 7, an annular fitting 31 is mounted in a central opening in the bottom wall 12a of the outer tank. This fitting provides a screw-threaded opening 32 which is coaxial with the motor-driven shaft 22. A screw-thread coupling 63 is threadedly received in this opening 32 and extends down to an outlet conduit 26 via a manual shutoff valve 29, an elbow 28, and a manual shutoff valve 27.

Referring to FIGS. 2 and 6, a manual shutoff valve 33a is comixed with valve 42 and pipe 37 connected to pipe 36 at the inlet side of the manual shutoff valve 33. Pipe 36 via control valve 33 is a main supply valve that is connected to pipe 35a, which is equipped with a backflow preventer meeting ANSIU/ASSE standards.

Figure 3:
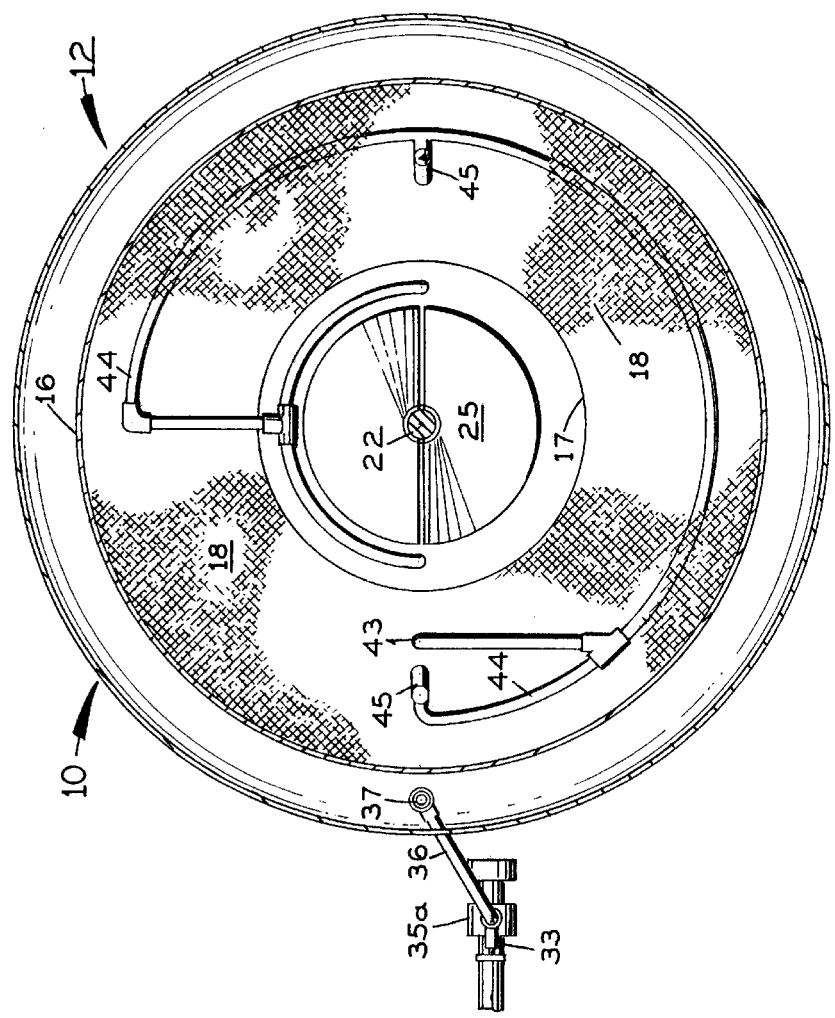
FIG. 3 is a horizontal cross-section taken along arrow 3—3 of the subject invention in FIG. 2.

Referring to FIGS. 2, 6 and 7, water supply pipe 37 is connected through a manual shutoff valve 42 to a pipe 43 extending up through the bottom walls 16a, 12a of the outer and inner tanks at the outside of the cylindrical lower end 17 of the screen. The upper end of pipe 43 extends up and around the screen 18, encircles the screen 18 approximately 270 degrees as a horizontal spray pipe 44 then enters the screen 18 from the opposite side extending downward to a point slightly above the lower mixing blade 25 and the drain basin 61 (See FIG. 3). The spray pipe 44, 45 has spray openings 46 for discharging water onto the screen and the inside of the inner tank 16.

With this arrangement in FIGS. 2 and 6, water is supplied to pipe 37 when valves 38 and 40 are open, and is supplied to spray pipe 44, 45 when valves 33 and 42 are open. If needed, water can be supplied to the tank and used to flush the tanks 12 and 16 by opening valve 33 and opening valves 33a and 42. Liquid may be removed from the bottom of the tank by opening valves 29 and 27, which pass the liquid to the outlet pipe 26 leading to the pump, the spray equipment or disposal units (not shown).

Figure 5:
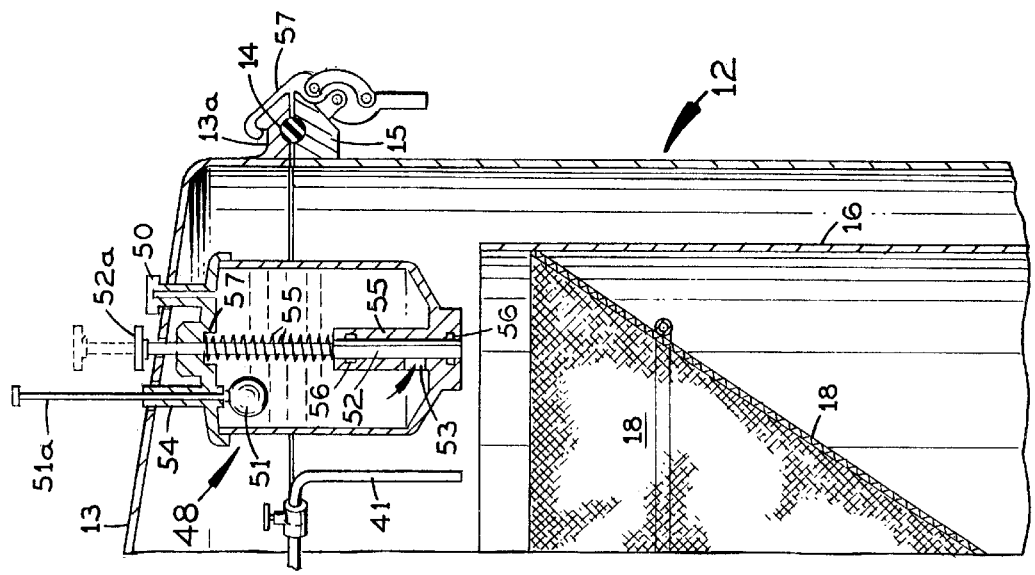
FIG. 5 is a partial vertical section taken along arrow 5—5 in FIG. 4.
Figure 4:
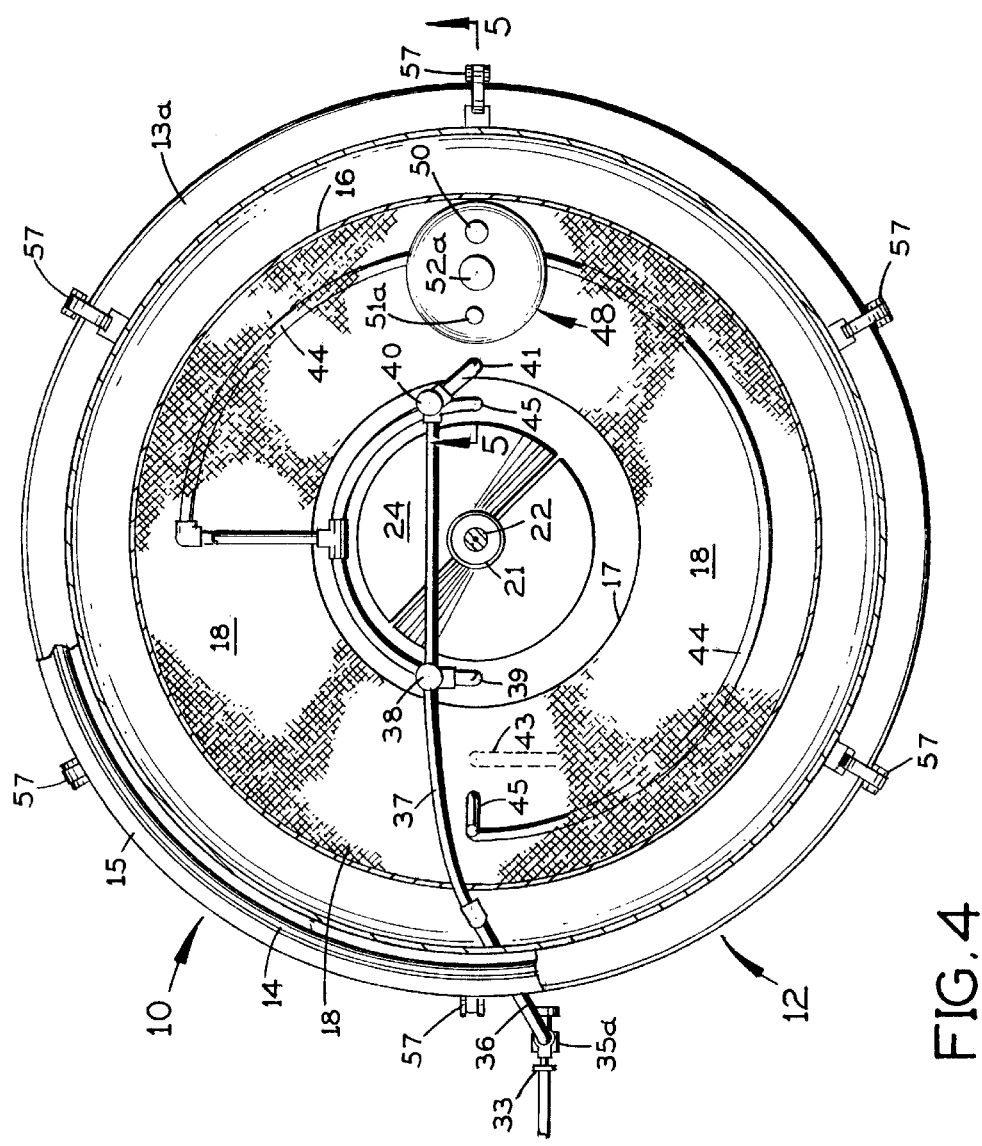
FIG. 4 is a horizontal cross-section taken along arrow 4—4 of the subject invention in FIG. 2.

Referring to FIGS. 2, 4 and 5, reservoir 48 for liquid insecticide or other treatment liquid for the lawn or other crop is attached to the top cover 13 for the outer tank as shown in FIG. 5. This reservoir is generally cylindrical and represents an upstanding interconnect 50a which extends up through the top cover 13 and is generally closed by a screw-threaded cap 50. When cap 50 is removed, the insecticide or other treatment liquid can be poured down into the reservoir 48. The liquid level in the reservoir is indicated by a calibrated stem 51a attached to a float ball 51 inside the reservoir. Stem 51a extends slidably through a guide collar 64 extending up from the top of the reservoir 48 through the top cover 13 for the tank.

Referring to FIGS. 1, 2, 4 and 5, the reservoir 48 has a normally closed discharge valve 52 which can be opened manually to pass the insecticide or other treatment liquid down into the mixing chamber. Valve 52 comprises a vertically displaceable, generally cylindrical valve member 52 which is slidably received in a generally cylindrical boss 65 joined to and extending above and below the bottom wall of the reservoir. The lower end of this boss extends down through an opening in the strainer 47. The boss 65 is formed with an inlet opening 53 on one side which provides fluid communication between the interior of the reservoir 48 at the bottom and the vertical cylindrical bore in the boss. The valve member 52 is slidably received in this bore. O-rings 56 of rubber, rubber-like material and the like are seated in the boss 65 and sealingly engage the valve member 52 above and below the inlet opening 53. The valve member 52 is formed with a longitudinal recess 54 which provides fluid communication between the inlet opening 53 and the mixing chamber below the strainer 47 when the valve is raised from the normally-closed position shown in FIG. 5. A valve stem 66 extends up from the valve member 52 and passes slidably through an opening 67 in the top of the reservoir. A knurled knob 52*a* is attached to the upper end of this valve stem above the top cover 13 for the tank. A coil spring 55 is engaged under compression between the top of the reservoir and the upper end of the valve member 52.

Referring to FIGS. 2, 4 and 5, spring 55 biases the valve member 52 down to a closed position in which its recess 54 is out of fluid communication with the inlet 53. When the knob 52*a* is grasped, the valve member 52 can be raised to the position shown in phantom in FIG. 5, in which the upper end of recess 54 in the valve member registers with the inlet 53 and the lower end of recess 54 remains in communication with the mixing chamber below the strainer 47. In this open position of the valve member 52, liquid can flow by gravity from the reservoir 48 down into this mixing chamber. The operation of the system will now be discussed.

Referring to FIG. 2, the tank is filled with water by opening valves 33, 38 and 40 to supply water to both downwardly extending discharge pipes 39 and 41. Granular fertilizer may be poured down through the hopper, H, onto the strainer 47. The fertilizer granules flow down through the strainer into the water-filled mixing chamber below. Insecticide or other treatment liquid can additionally be introduced into water-filled mixing chamber by opening the valve 52 as described. Float gage 51, 51*a* tells one how much of the liquid has been introduced before closing valve 52.

Motor 19 is turned on to start the mixing operation and valve 33 is closed to stop the supply of water to the mixing chamber. With valve 33 closed, valves 29 and 27 can be opened to pass the water mixture of fertilizer and/or insecticide or other treatment liquid from the bottom of the tank to the outlet conduit 26 leading to the spray equipment or irrigation and/or lawn sprinkling systems (not shown). The funnel-shaped screen 17, 18 has porous openings that are sized small enough to substantially prevent the fertilizer granules from passing through. Over time, screen 17, 18 and the inside of the inner tank 16 can be sprayed with water by opening valves 33, 33*a* and 42.

Figure 9:
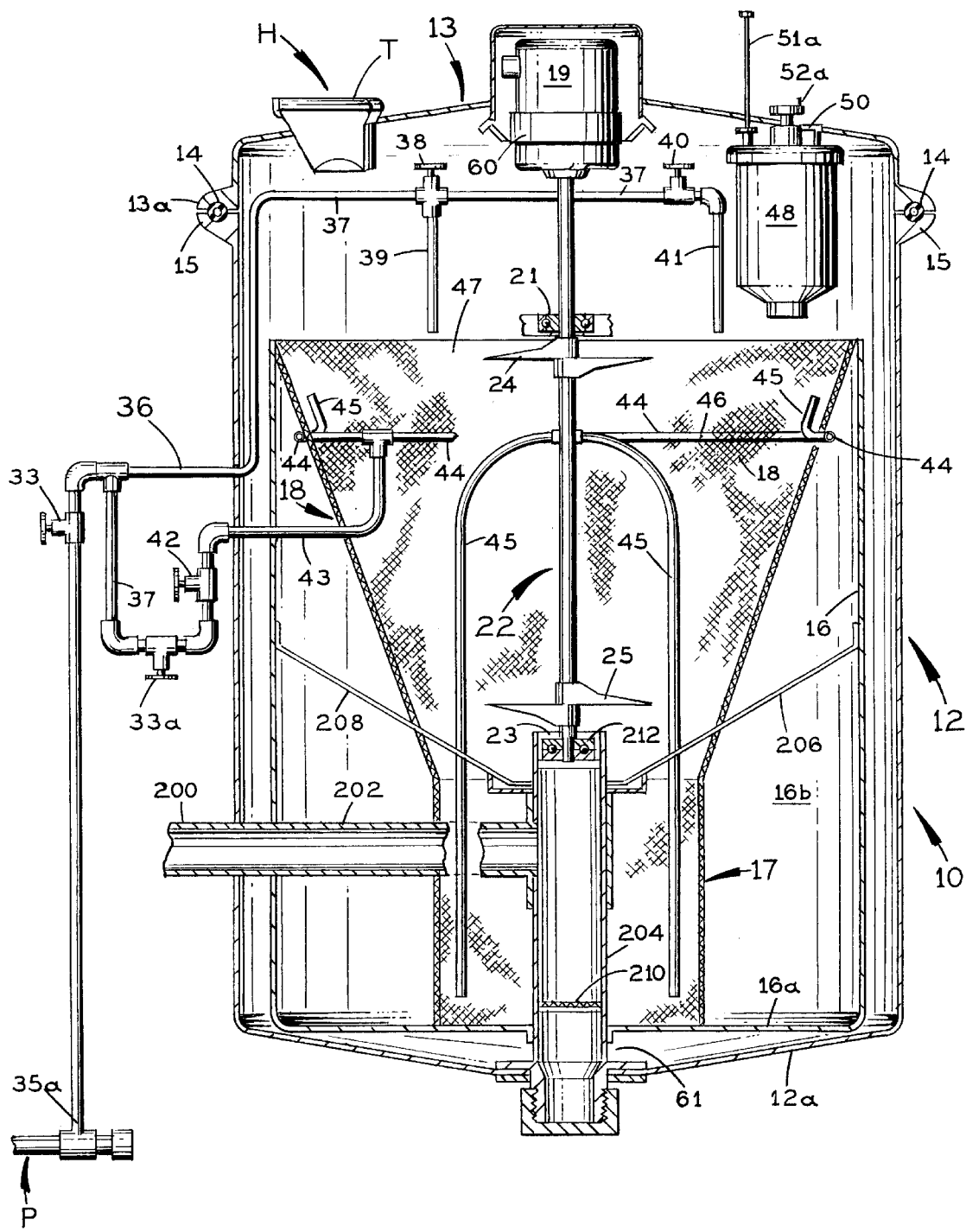
FIG. 9 shows another embodiment of the invention.

One application of the invention is shown in FIG. 9. Most of this embodiment is the same as the embodiment of FIG. 1 and will not be described again. The same reference numerals apply to like parts. In the embodiment of FIG. 9, the outlet 202 extends through the side walls of the tanks and communicates with an external pump (not shown). Outlet 200 communicates via pipes 202 and 204 with the bottom of the outer tank at 61, and water can be pumped out of the bottom of the tank using the external pump.

Arms 206 and 208 are support arms for holding the outlet pipes in place. There are three support arms. Strainer 210 is located in pipe 204. Bearing 212 receives the bottom of the shaft.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An apparatus for mixing at least one of a granular fertilizer and a treatment liquid with water comprising:

an upstanding outer tank having a top cover;

an upstanding inner tank which is open at the top and is spaced inside said outer tank;

a porous strainer extending across the inside of said inner tank adjacent the top cover;

a hopper on the top cover of the outer tank above said strainer for passing granular fertilizer down through said strainer into the inner tank;

a reservoir for the treatment liquid located between the top cover of the outer tank and the strainer;

means providing an inlet opening for the reservoir above the top cover of the outer tank for introducing the treatment liquid down into said reservoir;

a manually operated outlet valve at the bottom of said reservoir passing down through the strainer for discharging the treatment liquid from the reservoir down into the inner tank;

an electric motor mounted on said top cover of the outer tank;

a rotary shaft coupled to said motor to be driven thereby and extending down through said strainer into the inner tank;

mixing blades attached to said shaft inside the inner tank;

a water supply pipe extending from below said tanks up between the outer and inner tanks and across the top of said strainer and below said top cover of the outer tank, the pipe having outlets extending down through said strainer for discharging water down into the inner tank;

a spray pipe extending down into the outer tank and up into the inner tank and having spray openings inside the inner tank below said strainer;

valve means for selectively controlling water to both the water supply pipe and the spray pipe; and means defining an outlet opening at the bottom of the outer tank which is in fluid communication with the interior of the inner tank;

an upper sealed bearing supported by the strainer and rotatably receiving said shaft; and a recessed drain receiving plate mounted by fasteners to a drain coupling at the bottom of the tank;

and a drain which screws into the recessed drain plate, the drain including a housing to receive a lower sealed bearing;

a drain basin at the bottom of the tank;

wherein said lower sealed bearing rotatably receives the shaft; wherein said housing for the lower bearing is mounted in the middle of said drain basin at the bottom of the tank.

2. An apparatus according to claim 1, wherein said blades include:

upper and lower blade means spaced apart vertically along the shaft.

3. An apparatus according to claim 2, wherein said lower blade means is mounted on the shaft near the bottom of the inner tank.

4. An apparatus according to claim 1, wherein said outlet valve includes:

a vertically displaceable valve member at the bottom of the reservoir which extends down through the strainer;

a valve stem connected to said valve member and extending up through said top cover of the outer tank; and spring means biasing said valve member to a closed position blocking the flow of the treatment liquid from the reservoir down into the inner tank.

5. An apparatus according to claim 1, further comprising:

a float member inside the reservoir; and a stem extending up from said float member beyond said top cover of the outer tank and calibrated to indicate the level of the treatment liquid in the reservoir.

6. An apparatus according to claim 1, wherein said outlet opening comprises an upright outlet pipe extending downwardly within said inner tank to a point in close proximity to and above the bottom of the inner tank and is in communication with the bottom of the outer tank, and wherein said fluid outlet opening further comprises a lateral outlet pipe in fluid communication with said upright outlet pipe and extending through a side of said inner tank and through an adjacent side of said outer tank.

7. An apparatus for mixing at least one of a granular fertilizer and a treatment liquid with water comprising:

an upstanding outer tank having a top cover;

an upstanding inner tank which is open at the top and is spaced inside said outer tank;

a porous strainer extending across the inside of said inner tank adjacent the top cover;

a hopper on the top cover of the outer tank above said strainer for passing granular fertilizer down through said strainer into the inner tank;

a reservoir for the treatment liquid located between the top cover of the outer tank and the strainer;

means providing an inlet opening for the reservoir above the top cover of the outer tank for introducing the treatment liquid down into said reservoir;

a manually operated outlet valve at the bottom of said reservoir passing down through the strainer for discharging the treatment liquid from the reservoir down into the inner tank;

an electric motor mounted on said top cover of the outer tank;

a rotary shaft coupled to said motor to be driven thereby and extending down through said strainer into the inner tank;

mixing blades attached to said shaft inside the inner tank;

a water supply pipe extending from below said tanks up between the outer and inner tanks and across the top of said strainer and below said top cover of the outer tank, the pipe having outlets extending down through said strainer for discharging water down into the inner tank;

a spray pipe extending down into the outer tank and up into the inner tank and having spray openings inside the inner tank below said strainer;

valve means for selectively controlling water to both the water supply pipe and the spray pipe; and means defining an outlet opening at the bottom of the outer tank which is in fluid communication with the interior of the inner tank;

a generally funnel-shaped screen positioned inside said inner tank and extending around said shaft and said mixing blades, the screen having a wide upper end which is sealed to the inside of the inner tank immediately below said strainer and having a narrower lower end extending around said outlet opening at the bottom of the outer tank, the screen having a porosity effective to retain the granular fertilizer inside the screen as it flows down to the outlet opening;

wherein said spray pipe has a plurality of spray openings and extends horizontally around the outside of the funnel-shaped screen.

8. An apparatus according to claim 7, wherein said spray pipe further extends downwardly inside the inner tank at the inside of the screen and has a plurality of secondary spray openings.

9. An apparatus according to claim 7, and further comprising:

an upper sealed bearing rotatably receiving an upper end of the rotary shaft; and a lower sealed bearing rotatably receiving a lower end of the rotary shaft.

10. An apparatus according to claim 9, wherein said mixing blades include:

upper blade means attached to said shaft below said upper bearing; and lower blade means attached to said shaft above said lower bearing.

11. An apparatus according to claim 10, wherein said manually-operated outlet valve for the reservoir includes:

a vertically displaceable valve member which extends down below said strainer;

spring means biasing said valve member to a closed position blocking the flow of treatment liquid from said reservoir down into said inner tank; and a handle on the upper end of said valve member above the top cover of the outer tank.

* * * * *